United States Patent
Yoshida et al.

(10) Patent No.: US 6,632,331 B2
(45) Date of Patent: Oct. 14, 2003

(54) DISTILLATION OF POLYCYCLIC DIOL

(75) Inventors: Shu Yoshida, Ibaraki-ken (JP); Satoshi Nagai, Mie-ken (JP); Takashi Konishi, Mie-ken (JP); Makoto Sasaki, Mie-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/912,594

(22) Filed: Jul. 26, 2001

(65) Prior Publication Data

US 2002/0033324 A1 Mar. 21, 2002

(30) Foreign Application Priority Data

Jul. 27, 2000 (JP) ........................................ 2000-227756

(51) Int. Cl.$^7$ ............................. B01D 3/34; C07C 29/80; C07C 35/22
(52) U.S. Cl. ............................. 203/36; 203/37; 203/91; 568/817; 568/820; 568/868
(58) Field of Search ............................. 203/36, 37, 91, 203/17, 18; 568/817, 820, 868

(56) References Cited

U.S. PATENT DOCUMENTS

| | | | | | |
|---|---|---|---|---|---|
| 2,626,284 | A | * | 1/1953 | Smith | 568/913 |
| 2,753,297 | A | * | 7/1956 | Mason | 202/57 |
| 2,889,375 | A | * | 6/1959 | Gilbert et al. | 568/913 |
| 3,576,891 | A | * | 4/1971 | Rosenthal | 568/913 |
| 3,689,371 | A | * | 9/1972 | Kerbel et al. | 203/37 |
| 3,960,672 | A | * | 6/1976 | Ester | 203/18 |
| 3,990,952 | A | * | 11/1976 | Katzen et al. | 203/36 |
| 4,300,002 | A | * | 11/1981 | Shibatani et al. | 568/817 |
| 5,312,950 | A | * | 5/1994 | Boaz | 568/810 |
| 6,117,277 | A | * | 9/2000 | Zgorzelski et al. | 203/37 |

* cited by examiner

Primary Examiner—Virginia Manoharan
(74) Attorney, Agent, or Firm—Antonelli, Terry, Stout & Kraus, LLP

(57) ABSTRACT

Aldehyde compounds contained in polycyclic diols as impurities are effectively removed by distilling the polycyclic diols in the presence of an alkali metal compound and/or a alkaline earth compound. The distilled polycyclic diols are useful as a diol component of a polymer such as polycarbonate with less yellowing.

17 Claims, No Drawings

DISTILLATION OF POLYCYCLIC DIOL

BACKGROUND OF THE INVENTION

1. Field of the Invention

The present invention relates to a method of separating a polycyclic diol by distillation from a mixture containing the polycyclic diol and at least one aldehyde compound as impurity.

2. Description of the Prior Art

Commercially available polycyclic diols, for example, tricyclo[$5.2.1.0^{2,6}$]decane dimethanol (TCDDM) represented by the following formula:

usually contains aldehyde intermediates such as

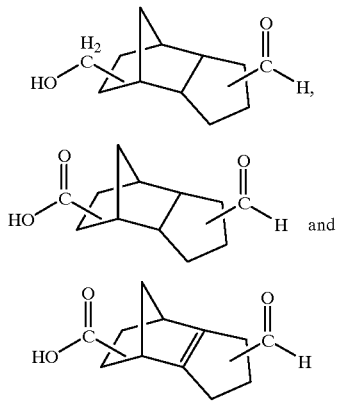

as impurities in a proportion of 3875 to 8000 ppm in terms of carbonyl in the aldehyde impurities. To purify TCDDM to an aldehyde impurity content corresponding to 2500 ppm carbonyl or lower, conventionally employed is a method wherein TCDDM is dissolved in an organic solvent such as alcohol, catalytically hydrogenated in the presence of a catalyst, and then distilled. However, this method requires an additional step of catalytic hydrogenation, necessitates the use and recovery of the organic solvent, and is likely to by-produce other impurities, thereby being disadvantageous economically.

As described above, commercially available polycyclic diols contain aldehyde compounds (precursors or intermediates of the polycyclic diols) as impurities. Since the boiling points of these aldehyde compounds are close to those of the polycyclic diols, the aldehyde compounds cannot be effectively removed from the polycyclic diols by usual distillation methods. In addition, since the aldehyde compounds are highly reactive, the remaining aldehyde compounds cause coloration or yellowness during an ester-interchange polymerization using the polycyclic diols as a monomer component.

SUMMARY OF THE INVENTION

As a result of extensive study in view of developing a method of purifying the polycyclic diol by distillation, the inventors have found that the aldehyde compound impurities can be effectively removed by distilling the polycyclic diol in the presence of 200 to 5000 ppm of an alkali metal compound and/or an alkaline earth metal compound. The present invention has been accomplished on the basis of this finding.

Thus, the present invention provide a method of purifying a polycyclic diol, which comprises distilling a mixture of the polycyclic diol and at least one aldehyde compound as impurity in the presence of an alkali metal compound and/or an alkaline earth compound in a proportion of 200 to 5000 ppm based on the polycyclic diol, thereby removing the aldehyde compound from the polycyclic diol.

DETAILED DESCRIPTION OF THE INVENTION

The distillation of the polycyclic diol of the present invention will be described below in more detail.

The purifying method of the present invention is characterized by distilling a crude polycyclic diol containing at least one aldehyde compound as impurities in the presence of 200 to 5000 ppm of an alkali metal compound and/or an alkaline earth metal compound, thereby efficiently removing the aldehyde compound impurities from the polycyclic diol.

The polycyclic diol referred to in the present invention is tricyclodecane dimethanol, bicycloheptane dimetanol, decalin dimethanol, pentacyclopentadecane dimethanol, norbornene dimethanol, etc., and particularly, 3,8-bis (hydroxymethyl)-tricyclo[$5.2.1.0^{2,6}$]decane and 4,9-bis (hydroxymethyl)-tricyclo[$5.2.1.0^{2,6}$]decane.

The alkali metal compound usable in the present invention may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, disodium salt of bisphenol A, dipotassium salt of bisphenol A, dicesium salt of bisphenol A, dilithium salt of bisphenol A, sodium phenolate, potassium phenolate, cesium phenolate, lithium phenolate, etc. Particularly preferred is potassium hydroxide.

The alkaline earth metal compound usable in the present invention may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium acetate, calcium acetate, strontium acetate, barium acetate, magnesium stearate, calcium stearate, calcium benzoate, and magnesium phenylphosphate.

These alkali metal compound and/or the alkaline earth metal compound may be used alone or in combination of two or more in the form of solid or solution in water or a lower alcohol such as methanol and ethanol, or a mixture thereof. The concentration of the solution is not specifically limited. The use amount of the alkali metal compound and/or the alkaline earth metal compound is 200 to 5000 ppm, preferably 500 to 2000 ppm in total based on the polycyclic diol.

The distillation of the polycyclic diol containing the aldehyde impurities is conducted as described below, although not strictly limited thereto.

A solid alkali metal compound and/or alkaline earth metal compound, or an aqueous or alcohol solution thereof having a concentration of 1 to 30% by weight is dissolved in the polycyclic diol in a proportion of 200 to 5000 ppm based on the polycyclic diol. The resultant solution is distilled at 180 to 230° C. under a reduced pressure of 0.1 to 15 mmHg. It is preferred to discard the initial distillate (about 5 to 20% of the solution being distilled) and collect the subsequent main distillate (about 80 to 95% of the solution being distilled) as the purified polycyclic diol. The aldehyde concentration in the polycyclic diol purified by the method of the present invention is lower than the detection limit, i.e., 25 ppm in terms of carbonyl group.

The purified polycyclic diol thus obtained is preferably used as a diol component for producing various polymer, particularly polycarbonate, with less yellowing.

The present invention will be explained in more detail by reference to the following example which should not be construed to limit the scope of the present invention.

Aldehyde Content

The content of the aldehyde impurities (carbonyl content) in the polycyclic diol was determined by absorption spectrophotometry of a hydrazone derived from the reaction of 2,4-dinitrophenylhydrazine and the carbonyl of the aldehyde impurities according to the following reaction scheme.

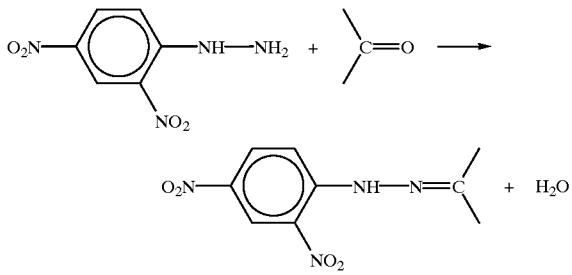

1. Preparation of Reagents

Carbonyl-free Methanol (MeOH)

Into 500 mL of guaranteed methanol, were added about 5 g of 2,4-dinitrophenylhydrazine and several drops of concentrated hydrochloric acid. After boiling the methanol mixture for two hours, methanol was subjected to fractional distillation. The collected fraction was sealed and stored in a refrigerator.

2,4-Dinitrophenylhydrazine (DNP)

2,4-Dinitrophenylhydrazine was purified twice by recrystallization from the carbonyl-free methanol. The obtained crystals were vacuum-dried and stored in a refrigerator while shielding them from light by aluminum foil. DNP saturated solution Into a 100-mL ground stopper Erlenmeyer flask, were placed 0.165 g of DNP and 50 mL of MeOH. The contents were heated over a water bath of 50° C. for 30 min under stirring, allowed to stand at room temperature for at least one hour for cooling, and filtered through a 5A filter paper. The solution was prepared just prior to its use and kept shielded against light by aluminum foil.

10 wt % KOH Solution

KOH placed in a polymer bottle was diluted with deionized water.

2. Absorption Spectrophotometry

After accurately weighing a sample TCDDM (40 to 42 mg) into a screwed test tube, 1 mL of the carbonyl-free methanol (MeOH) was added thereinto.

After completely dissolved, 1 mL of DNP saturated solution and two drops of hydrochloric acid were further added, and the test tube was shaken for 10 sec.

After tightly sealing, the test tube was heated at 100° C. in a drier for five minutes, shaken for 10 sec, and then allowed to stand for 30 min. After cooled to room temperature, 5 mL of MeOH were added to the test tube, which was further shaken for 10 sec.

Then, 4 mL of 10 wt % KOH solution were added to the test tube, which was shaken for 60 sec, thereby preparing a sample solution for absorption spectrophotometry. A solution for blank test was prepared in the same manner as above except for omitting TCDDM.

After allowing each sample solution to stand for 1 hr to 1.5 hr to stabilize the color development, the absorbancy of each sample solution was measured in the range of 400 to 650 nm.

The measured results were calibrated by a calibration curve obtained using benzaldehyde, thereby calculating the content of aldehyde impurities (carbonyl content) in the sample PCDDM.

EXAMPLE 1

TCDDM-A

TCDDM (tricyclo[$5.2.1.0^{2,6}$]decane dimethanol) having a carbonyl content of 3875 to 8000 ppm (available from Hoechst Celanese Co., Ltd.) was used. A mixture of 328.8 g of TCDDM and 0.7 g of 20% potassium hydroxide solution in methanol was distilled at 190° C. under a reduced pressure of 0.32 mmHg. The distillation temperature was 151° C. The initial distillate, 90.0 g (28.0%) was discarded and 193.0 g (58.6%) of the subsequent distillate was collected as the main fraction. The residue in the flask was 28.1 g (8.5%). The carbonyl content of the distilled TCDDM (TCDDM-A) was lower than the detection limit (25 ppm).

Comparative Example 1

TCDDM-B

TCDDM was distilled in the same manner as in Example 1 except for omitting the addition of potassium hydroxide. The carbonyl content of the distilled TCDDM (TCDDM-B) was 6982 ppm.

Reference Example 1

Into a 300-mL four-necked flask equipped with a stirring device and a distillation device, were placed 26.8 g (0.10 mol) of bisphenol Z (BPZ), 22.8 g (0.10 mol) of TCDDM-A, 43.3 g (0.202 mol) of diphenyl carbonate, and $6.0 \times 10^{-7}$ mol of sodium hydrogen carbonate. The contents were heated to 180° C. under nitrogen atmosphere, and stirred for 30 min. Then, the pressure was reduced to 150 mmHg while the temperature was raised to 200° C. at a temperature-rising speed of 60° C./hr, thereby allowing the ester interchange reaction to proceed. The temperature was further raised to 240° C. while distilling off phenol. After keeping the temperature at 240° C. for 10 min, the pressure was reduced to 1 mmHg or lower over one hour. The reaction was allowed to proceed for 6 hr in total under stirring, and then, the pressure was returned to ordinary pressure by introducing nitrogen into the reactor, thereby obtaining polycarbonate. The properties of the polycarbonate are shown in Table 1.

Reference Example 2

The same procedure as in Reference Example 1 was repeated except for using 34.2 g (0.15mol) of BPA (bisphenolA) and 11.4 g (0.05 mol) of TCDDM-A, thereby obtaining a BPA-TCDDM copolycarbonate. The properties of the polycarbonate are shown in Table 1.

Reference Example 3

The same procedure as in Reference Example 1 was repeated except for using 13.7 g (0.06 mol) of BPA and 31.9 g (0.14 mol) of TCDDM-A, thereby obtaining a BPA-TCDDM copolycarbonate. The properties of the polycarbonate are shown in Table 1.

Reference Example 4

The same procedure as in Reference Example 1 was repeated except for using 11.4 g (0.05 mol) of BPA, 13.4 g (0.05 mol) of BPZ, and 22.8 g (0.10 mol) of TCDDM-A, thereby obtaining a BPA-BPZ-TCDDM copolycarbonate. The properties of the polycarbonate are shown in Table 1.

Reference Example 5

The same procedure as in Reference Example 1 was repeated except for using 11.4 g (0.05 mol) of BPA, 13.4 g (0.05 mol) of BPZ, and 22.8 g (0.10 mol) of TCDDM-B, thereby obtaining a BPA-BPZ-TCDDM copolycarbonate. The properties of the polycarbonate are shown in Table 1.

The properties in Table 1 were determined by the following methods.

(1) Weight Average Molecular Weight (Mw)

Measured using a gel permeation chromatograph (Shodex GPC system 11) while calibrating by styrene standard. Chloroform was used as the developing solvent.

(2) Glass Transition Temperature (Tg)

Measured using a differential scanning calorimeter.

(3) Refractive Index

Measured according to JIS K 7105 using Abbe refractometer.

(4) Abbe's Number

Calculated by the refractive indices measured by Abbe refractometer.

(5) Falling Ball Impact Resistance

A steel ball was fallen onto a sample of 50 mm diameter and 3.0 mm thickness from 7 cm above the sample. The impact resistance was expressed by the weight of the steel ball when the sample was broken.

(6) YI Value (Yellowness)

Measured by a differential calorimeter (TC-1800MKZ available from Tokyo Denshoku Kogyo Co., Ltd.) on a disk of 40 mm diameter and 3.0 mm thickness prepared by press-molding the resin.

TABLE 1

| | Reference Examples | | | | |
|---|---|---|---|---|---|
| | 1 | 2 | 3 | 4 | 5 |
| Mw | 55000 | 47000 | 58000 | 57100 | 51000 |
| Tg (° C.) | 108 | 125 | 95 | 125 | 124 |
| Refractive index | 1.558 | 1.568 | 1.546 | 1.560 | 1.572 |
| Abbe's number | 39 | 33 | 43 | 39 | 38 |
| Falling ball impact resistance (g) | 500< | 500< | 250 | 500< | 500< |
| YI value | 2.0 | 1.9 | 2.2 | 1.7 | 5.2 |

As described above, by the distillation method of the present invention, the aldehyde compounds causing the coloring or yellowing during the ester-interchange polymerization is effectively removed from the polycyclic diols.

What is claimed is:

1. A method of purifying a polycyclic diol, which comprises distilling a mixture of the polycyclic diol and at least one aldehyde compound as impurity in the presence of an alkali metal compound and/or an alkaline earth metal compound in a proportion of 200 to 5000 ppm based on the polycyclic diol, at 180°–230° C. under a reduced pressure of 0.1 to 15 mmHg, thereby removing the aldehyde compound from the polycyclic diol, wherein the polycyclic diol is at least one diol selected from the group consisting of tricyclodecane dimethanol, bicycloheptane dimethanol, decalin dimethanol, pentacyclopentadecane dimethanol, and norbornene dimethanol.

2. The method according to claim 1, wherein the aldehyde compound is a precursor or intermediate for producing the polycyclic diol.

3. The method according to claim 1, wherein the alkali metal compound is at least one compound selected from the group consisting of alkali metal hydroxide, alkali metal hydrogen carbonate, alkali metal carbonate, alkali metal acetate, alkali metal stearate, alkali metal borohydride, alkali metal phenylborate, alkali metal benzoate, alkali metal hydrogenphosphate, bisphenol A alkali metal salt, and alkali metal phenolate.

4. The method according to claim 3, wherein the alkali metal compound is potassium hydroxide.

5. The method according to claim 1, wherein the alkaline earth metal compound is at least one compound selected from the group consisting of alkaline earth metal hydroxide, alkaline earth metal hydrogen carbonate, alkaline earth metal acetate, alkaline earth metal stearate, alkaline earth metal benzoate, and alkaline earth metal phenylphosphate.

6. The method according to claim 1, wherein the distillation is carried out in the presence of potassium hydroxide in a proportion of 300 to 800 ppm based on the polycyclic diol.

7. The method according to claim 1, wherein the alkali metal compound and/or the alkaline earth metal compound is added to the mixture in the form of aqueous or alcohol solution.

8. The method according to claim 1, wherein the alkali metal compound and/or alkaline earth metal compound is present in a proportion of 500 to 2000 ppm based on the polycyclic diol.

9. The method according to claim 1, wherein the alkali metal compound and/or alkaline earth metal compound is present in a proportion of 300 to 800 ppm based on the polycyclic diol.

10. The method according to claim 9, wherein the alkali metal compound and/or the alkaline earth metal compound is added to the mixture in the form of an aqueous or alcohol solution.

11. A method of purifying a polycyclic diol, which comprises distilling a mixture of the polycyclic diol and at least one aldehyde compound as impurity in the presence of an alkali metal compound and/or an alkaline earth metal compound in a proportion of 300 to 800 ppm based on the polycyclic diol, at 180°–230° C. under a reduced pressure of 0.1 to 15 mmHg, thereby removing the aldehyde compound from the polycyclic diol, wherein the polycyclic diol is selected from the group consisting of tricyclo [$5.2.1.0^{2,6}$] decane dimethanol and pentacyclopentadecane dimethanol.

12. The method according to claim 11, wherein the aldehyde compound is a precursor or intermediate for producing the polycyclic diol.

13. The method according to claim 11, wherein the alkali metal compound is at least one compound selected from the group consisting of alkali metal hydroxide, alkali metal hydrogen carbonate, alkali metal carbonate, alkali metal acetate, alkali metal stearate, alkali metal borohydride, alkali metal phenylborate, alkali metal benzoate, alkali metal hydrogenphosphate, bisphenol A alkali metal salt, and alkali metal phenolate.

14. The method according to claim 13, wherein the alkali metal compound is potassium hydroxide.

15. The method according to claim 11, wherein the alkaline earth metal compound is at least one compound selected from the group consisting of alkaline earth metal hydroxide, alkaline earth metal hydrogen carbonate, alkaline earth metal acetate, alkaline earth metal stearate, alkaline earth metal benzoate, and alkaline earth metal phenylphosphate.

16. A method of purifying a polycyclic diol, which comprises distilling a mixture of the polycyclic diol and at least one aldehyde compound as impurity in the presence of an alkali metal compound and/or an alkaline earth metal compound in a proportion of 200 to 5000 ppm based on the polycyclic diol, at 180°–230° C. under a reduced pressure of 0.1 to 15 mmHg, thereby removing the aldehyde compound from the polycyclic diol, wherein the polycyclic diol is tricyclo $[5.2.1.0^{2,6}]$ decane dimethanol.

17. A method of purifying a polycyclic diol, which comprises distilling a mixture of the polycyclic diol and at least one aldehyde compound as impurity in the presence of an alkali metal compound and/or an alkaline earth metal compound in a proportion of 200 to 5000 ppm based on the polycyclic diol, at 180°–230° C. under a reduced pressure of 0.1 to 15 mmHg, thereby removing the aldehyde compound from the polycyclic diol, wherein the polycyclic diol is pentacyclopentadecane dimethanol.

* * * * *